UNITED STATES PATENT OFFICE.

CHARLES L. ROWLAND, OF NEW YORK, N. Y.

ART OF PRODUCING ILLUMINATING-GAS.

SPECIFICATION forming part of Letters Patent No. 649,550, dated May 15, 1900.

Application filed March 13, 1897. Serial No. 627,392. (No specimens.)

*To all whom it may concern:*

Be it known that I, CHARLES L. ROWLAND, a citizen of the United States, residing at New York, (Brooklyn,) in the county of Kings and State of New York, have invented certain new and useful Improvements in the Art of Producing Illuminating-Gas, of which the following is a specification.

I have found that when metallic chlorids are brought into intimate contact with incandescent carbon certain reactions occur by which I am enabled to produce illuminants in gaseous form and under certain conditions marketable by-products. In some cases these reactions are facilitated and the range of reactions enlarged by the introduction of steam or the products of the decomposition of steam or free hydrogen. For instance, I have found that when chlorid of sodium is brought into intimate contact with incandescent carbon in the presence of steam or hydrogen the reactions that occur are such that I may produce an illuminant or illuminants that combine or mix with the non-illuminating gas, forming a fixed illuminating-gas, and that by-products are formed which may be segregated from the gaseous products in any of the well-known ways. I have demonstrated that the results above suggested are produced by introducing steam or hydrogen and chlorid of sodium either in granular form or in a state of fusion or vapor into the presence of incandescent carbon in an ordinary water-gas generator having the usual water seal and adjuncts of a water-gas plant, that the crude water-gas is enriched by the illuminant or illuminants produced, and that some of the commercial by-products produced are hydrochloric acid and caustic soda. I believe that among the illuminants which have been produced by me, as above stated, are ethine, methane, and ethane. I have therefore been able to produce these gases in a commercial way at small cost and at relatively-lower temperature than is ordinarily needed for producing calcium carbid, but not much, if any, higher than is generally employed in producing water-gas and directly from the mass of incandescent carbon. Probably a temperature of about 2,000° Fahrenheit would produce excellent commercial results.

In explaining the chemical reactions which take place in operating this gas process I can only do this by deductions from evidences outside of the incandescent space in the interior of my gas-generator and from recognition of chemical laws already well established and quite generally known. The process may be explained as follows: The incandescent carbon in the interior of my gas-generator is at one stage of the process surrounded by the vapor of sodium chlorid. Then a mixture of carbonic-oxid and hydrogen gases is introduced, which may be elsewhere produced or by a previous run of the same generator, the hydrogen of which unites with the chlorin of the sodium chlorid present, producing hydrochloric-acid gas, and the sodium thereby loosened from a previous combination immediately unites with a portion of the incandescent carbon with which it is in contact, producing sodium carbid, ($C_2Na_4$,) and the latter, together with clinkers and ashes, slowly works down toward the bottom of the retort, where, coming in contact with the carbonic-oxid and hydrogen mixture at a lower temperature, the following reaction takes place:

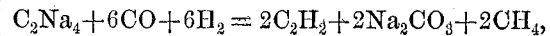

and the resulting ethine and methane, together with the excess of carbon monoxid and hydrogen injected into the retort, rise together and quickly come into the hottest zone of the generator, where a large part of the ethine is decomposed thus:

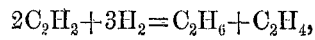

the carbon monoxid and methane present apparently taking no part in this reaction. On account of the high heat in this part of the generator much of the ethane and ethylene here produced is itself decomposed with the deposition of carbon and production of an increased quantity of methane, which, together with the excess of carbon monoxid and hydrogen always present and the hydrochloric-acid gas, passes upward and through the water-box, where most of the acid gas is retained. The decomposition of the ethine ($C_2H_2$) and ethene ($C_2H_4$) by the hottest zone of the retort is a matter to be avoided as far as possible, and I have found that by working the generator at a lower than usual temperature in such apparatus or by an extra swift draft of the gases through the retort a portion of the ethine and ethene escapes decomposition, so that under these conditions the proportion of ethine and ethene taken together would be four per cent., more or less, in the finished gas, the methane and ethane of course being in larger quantity and the carbon monoxid and hydrogen larger yet. When, however, steam instead of the mixture of carbon monoxid and hydrogen is injected into the retort or generator containing the incandescent carbon and sodium-chlorid vapor, the reactions are somewhat different. The first effect of the water-vapor coming in contact with the sodium carbid which has settled, together with the ashes and clinkers, to the bottom of the generator is to decompose the sodium carbid, with production of ethene ($C_2H_4$) and sodium hydrate thus:

$$2C_2Na_4 + 8H_2O = 2C_2H_4 + 8NaOH.$$

The sodium hydrate produced of course remains mixed with the ashes, from which it may be recovered by leaching, while the ethene ($C_2H_4$) mixed with the excess of steam ascends into the hotter part of the chamber, where the incandescent portion decomposes the remainder of the steam, with production of carbonic oxid and free hydrogen in the usual and well-known way, and the resulting free hydrogen decomposes the salt-vapor, as before described, with production of hydrochloric-acid gas and sodium carbid, the same as when water-gas instead of steam is injected into the retort. Where the coal used is of a bituminous or semibituminous nature, the results have proved rather better when water-gas is injected into the retort instead of undecomposed steam. Where, however, anthracite coal or hard coke is used, steam appears to work best. When anthracite coal is used and the temperature unusually high, only the merest trace of ethine ($C_2H_2$) and ethene ($C_2H_4$) is found on analysis of the gas, the hydrocarbons produced being principally methane, ($CH_4$,) with a less quantity of ethane, ($C_2H_6$,) these two hydrocarbons taken together running from four to seven per cent. of the finished gas. When, however, the temperature of the interior of the retort is prevented from going so high even though the same anthracite coal is used, the percentage of ethine or acetylene will sometimes rise as high as three per cent. and the ethene to four or five per cent. of the finished gas. From some causes the reactions in the retort will sometimes produce sodium carbid of the composition $Na_2C_2$ instead of $C_2Na_4$. Both of these carbids may be produced under but slightly different conditions so far as my experience indicates. Both of these sodium carbids $C_2Na_4$ and $C_2Na_2$ appear to be nearly equally good as producers of illuminant hydrocarbons in the gas though the reactions of the two with free hydrogen and water-vapor are very likely somewhat different, the $C_2Na_2$ with free hydrogen and monoxid and heat reacting perhaps as follows:

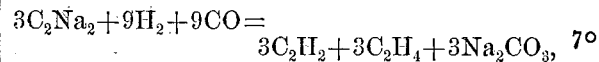

while when acted upon by steam the change can be expressed thus:

$$C_2Na_2 + 2H_2O = C_2H_2 + 2NaOH,$$

in this latter reaction sodium hydrate instead of carbonate being produced and of the hydrocarbons ethine alone and no ethene being generated.

Analyses of the gaseous products of the operation vary slightly on account of the special conditions peculiar to each run or operation of the generator, but a good average thereof is shown by the following figures: H, 49.40; CO, 32.24; $CO_2$, 4.56; $CH_4$, 8.02; $C_2H_2$, 2.25; $C_2H_4$, 3.53; total, 100. There are also traces of other elements, as sulfureted hydrogen and nitrogen, but the quantities are exceedingly small.

In operating the generator when a metallic chlorid, as chlorid of sodium, is not used analysis of the products of different runs of the generator shows somewhat different results, as is usually and necessarily the case because of variations in temperature and other conditions. Similarly variations in the analyses of the product of different runs of the generator occur when sodium chlorid is used. The following are different analyses of the products of three different runs of the generator when sodium chlorid was not used:

| | | | |
|---|---|---|---|
| Hydrogen............ | 52.83 | 54.28 | 51.73 |
| Carbonic oxid....... | 35.85 | 39.26 | 37.95 |
| Carbon dioxid ...... | 5.66 | 5.72 | 4.74 |
| Nitrogen ........... | 2.83 | 2.46 | 3.42 |
| Oxygen............. | .70 | .28 | .07 |
| Marsh-gas .......... | .00 | .00 | 2.09 |
| | 100.00 | 100.00 | 100.00 |

This process may be practiced with an ordinary water-gas plant run in the ordinary way to generate crude water-gas or "producer-gas" by introducing at the top of the generator, either mixed with the fuel or not, chlorid of sodium or other metallic chorid. The metallic chlorid so introduced will become fused and descend into the body of incandescent fuel, where the reactions occur in the presence of the incandescent carbon and the steam or the products of decomposition of the steam, the illuminants so produced by such reactions then combining or mixing with the water-gas, and the gaseous products of the operation are drawn off in the usual way for the usual treatment. My invention is, however, not limited to such a mode of procedure and may be practiced in other ways.

Where the chlorids of metals other than those of the monovalent class are used, then the quantities of the equations expressing the reactions of such elements in my process simply require doubling or trebling, according to the valency of the metal whose chlorid is used. In practicing this process the generator may be charged and operated in the manner and under the conditions as to temperature, &c., ordinarily followed in making producer-gas or water-gas. The metallic chlorid, as chlorid of sodium, may be introduced at the top, as stated. Generally stated, the products whose presence in the resulting gas is due to the introduction of the chlorid of sodium is proportionate to the amount of chlorid of sodium used. Of course, however, if the chlorid of sodium be introduced in excessive quantities it will merely be wasted and will melt and descend to the bottom of the generator. Generally, therefore, the amount of metallic chlorid that may be effectively used depends upon the volume of the fuel in the generator. Good commercial results may be obtained from the consumption of a given amount of coal by the use from time to time during the several runs of an amount of salt equal to about from five per cent. to ten per cent. of the coal used. I do not, however, confine myself to such proportions, nor am I prepared to say that they would be the most economical in practice.

I claim as my invention—

1. The herein-described process of producing illuminating-gas and by-products which consists in subjecting metallic chlorid to the action of incandescent carbon in the presence of steam, or the products of decomposition of steam.

2. The herein-described process of producing gas and by-products which consists in subjecting chlorid of sodium to the action of incandescent carbon in the presence of steam, or the products of decomposition of steam.

3. The herein-described process which consists in subjecting metallic chlorid to the action of incandescent carbon in the presence of steam, or the products of decomposition of steam, thereby producing an illuminating-gas, and then drawing off the gaseous products of the operation for treatment and storage in the usual way.

4. The herein-described process which consists in subjecting chlorid of sodium to the action of incandescent carbon in the presence of steam, or the products of decomposition of steam, thereby producing an illuminating-gas, and then drawing off the gaseous products of the operation for treatment and storage in the usual way.

5. The herein-described process of producing illuminating-gas and by-products which consists in subjecting metallic chlorid to the action of incandescent carbon in the presence of hydrogen.

6. The herein-described process which consists in subjecting metallic chlorid to the action of incandescent carbon in the presence of hydrogen thereby producing an illuminating-gas, then drawing off the gaseous products of the operation for treatment and storage in the usual way.

In testimony whereof I have hereunto subscribed my name.

CHARLES L. ROWLAND.

Witnesses:
 FRANK S. OBER,
 C. D. LADLEE.